(12) United States Patent
Lauwerys et al.

(10) Patent No.: US 7,386,378 B2
(45) Date of Patent: Jun. 10, 2008

(54) LINEAR CONTROL OF AN AUTOMOBILE SUSPENSION

(75) Inventors: Christophe Lauwerys, Kessel-Lo (BE); Jan Swevers, Meldert (BE); Paul Sas, Bierbeek (BE)

(73) Assignee: Tenneco Automotive Operating Company, Inc., Lake Forest, IL (US)

( * ) Notice: Subject to any disclaimer, the term of this patent is extended or adjusted under 35 U.S.C. 154(b) by 587 days.

(21) Appl. No.: 10/861,373

(22) Filed: Jun. 7, 2004

(65) Prior Publication Data
US 2005/0071060 A1   Mar. 31, 2005

Related U.S. Application Data

(60) Provisional application No. 60/502,044, filed on Sep. 11, 2003.

(51) Int. Cl.
*B60G 17/016* (2006.01)

(52) U.S. Cl. .................. 701/38; 188/266.2; 188/267.2; 280/124.159; 280/124.16

(58) Field of Classification Search ............ 188/299.1, 188/266.1–266.7, 267, 267.1, 267.2; 280/124.159, 280/124.16, 124.161; 701/38
See application file for complete search history.

(56) References Cited

U.S. PATENT DOCUMENTS

| | | | |
|---|---|---|---|
| 5,231,583 A * | 7/1993 | Lizell | 701/37 |
| 5,390,121 A * | 2/1995 | Wolfe | 701/37 |
| 5,682,968 A | 11/1997 | Boichot et al. | |
| 5,682,980 A | 11/1997 | Reybrouck | |
| 6,112,866 A * | 9/2000 | Boichot et al. | 188/299.1 |
| 6,157,879 A * | 12/2000 | Kwack et al. | 701/37 |
| 6,283,259 B1 * | 9/2001 | Nakadate | 188/322.2 |
| 2002/0166741 A1 | 11/2002 | Kock et al. | |
| 2004/0153226 A1 * | 8/2004 | Song | 701/37 |

FOREIGN PATENT DOCUMENTS

| | | |
|---|---|---|
| DE | 43 02 884 A1 | 2/1993 |
| EP | 0 591 754 A1 | 9/1993 |
| EP | 0691 226 A1 | 1/1996 |
| EP | 1 256 467 A2 | 5/2002 |

(Continued)

OTHER PUBLICATIONS

"Road-Adaptive Nonlinear Design of Active Suspensions," by Jung-Shan Lin and Ioannis Kanellakopoulos, from *Proceedings of the 1997 American Control Conference*, Albuquerque, NM, Jun. 1997, pp. 714-718.

(Continued)

*Primary Examiner*—Anne Marie M. Boehler
*Assistant Examiner*—Timothy Wilhelm
(74) *Attorney, Agent, or Firm*—Womble, Carlyle Sandridge & Rice, PLLC

(57) ABSTRACT

A vehicle suspension system that includes a cylinder, a rod inserted within the cylinder, a piston coupled to the rod and a piston valve which has an input piston current. The suspension system further includes a base coupled to the cylinder, a base valve which has an input base current, and a controller coupled to the piston valve and the base valve. The controller is adapted to generate the input piston current and the input base current based on a generated virtual current.

14 Claims, 9 Drawing Sheets

FOREIGN PATENT DOCUMENTS

| | | | |
|---|---|---|---|
| GB | 2 343931 A | | 5/2000 |
| JP | 04296231 A | * | 10/1992 |
| JP | 05164176 A | * | 6/1993 |
| JP | 05280569 A | * | 10/1993 |
| WO | PCT/US91/01519 | | 4/1991 |

OTHER PUBLICATIONS

"State-Feedback Control for Passenger Ride Dynamics," by E. Esmailzadeh and H.D. Taghirad, from *Proceedings of the CSME Forum*, 2:822-834, Jun. 1994.

"Road Adaptive Active Suspension Design Using Linear Parameter-Varying Gain-Scheduling," by Ian Fialho and Gary J. Balas, from *IEEE Transactions on Control System Technology*, vol. 10, No. 1, Jan. 2002.

"Active Suspension Design Using Linear Parameter Varying Control," by P. Gasper, I. Szaszi and J. Bokor, from *Int. J. of Vehicle Autonomous Systems (IJVAS)*, vol. 1, No. 2, 2003.

International Search Report for PCT/US2004/029516 and Opinion.

* cited by examiner

LINEAR CONTROL OF AN AUTOMOBILE SUSPENSION

RELATED APPLICATIONS

This application claims the benefit of U.S. Provisional Application No. 60/502,044, filed Sep. 11, 2003, the specification of which is herein incorporated by reference.

FIELD OF THE INVENTION

One embodiment of the present invention is directed to an automobile suspension system. More particularly, one embodiment of the present invention is directed to the linear control of an active automobile suspension system.

BACKGROUND INFORMATION

Comfort and road handling performance of a passenger car are mainly determined by the damping characteristic of the shock absorbers. Passive shock absorbers have a fixed damping characteristic determined by their design. Depending on the road excitation, however, it is desirable to adjust this characteristic to increase performance. Semi-active and active suspension systems offer the possibility to vary the damper characteristics along with the road profile (e.g., by changing the restriction of one or two current controlled valves). An active shock absorber has the additional advantages that negative damping can be provided and that a larger range of forces can be generated at low velocities, thereby potentially allowing an increase in system performance.

Several theoretical linear and nonlinear techniques have been described to control a car using an active suspension. These techniques apply linear control strategies based on linear physical car models consisting of lumped masses, linear springs and dampers, and an active shock absorber modelled as an ideal force source. However, real car dynamics are much more complex and active shock absorbers are not ideal force sources but have a complex nonlinear dynamic behaviour. As a result of these unrealistic assumptions, these prior art linear control approaches are not appropriate for practical applications.

Nonlinear control strategies such as linear parameter varying gain scheduling and backstepping have been applied to active suspension systems and validated by means of simulations only. These controllers are based on a linear or nonlinear physical car model in combination with a nonlinear physical damper model. These models have a large number of parameters. The experimental identification of these model parameters is a complex (non-convex optimization) problem. In addition, design and tuning of the above mentioned nonlinear controllers are not straightforward. Basically, the use of nonlinear models and controllers leads to very time-consuming designs, since no standard techniques or software tools are available. Finally, the implementation of these controllers is too complex for practical use in a passenger car control system.

Based on the foregoing, there is a need for an improved active suspension system that utilizes linear control.

SUMMARY OF THE INVENTION

One embodiment of the present invention is a vehicle suspension system that includes a cylinder, a rod inserted within the cylinder, a piston coupled to the rod and a piston valve which has an input piston current. The suspension system further includes a base coupled to the cylinder, a base valve which has an input base current, and a controller coupled to the piston valve and the base valve. The controller is adapted to generate the input piston current and the input base current based on a generated virtual current.

DETAILED DESCRIPTION

One embodiment of the present invention is an active shock absorber that includes a controller that calculates a virtual current based on the upward or downward acceleration of the vehicle and the wheel. The virtual current is then used to calculate input currents to the shock absorber using relatively simple linear techniques.

One embodiment of the active shock absorber hardware of the present invention is designed such that its open loop (uncontrolled) dynamic characteristic is comparable to that of a passive shock absorber tuned for the same type of car. The performance is then further improved by means of a controller that regulates the damping characteristic of the active shock absorber according to the road.

Figure 1:
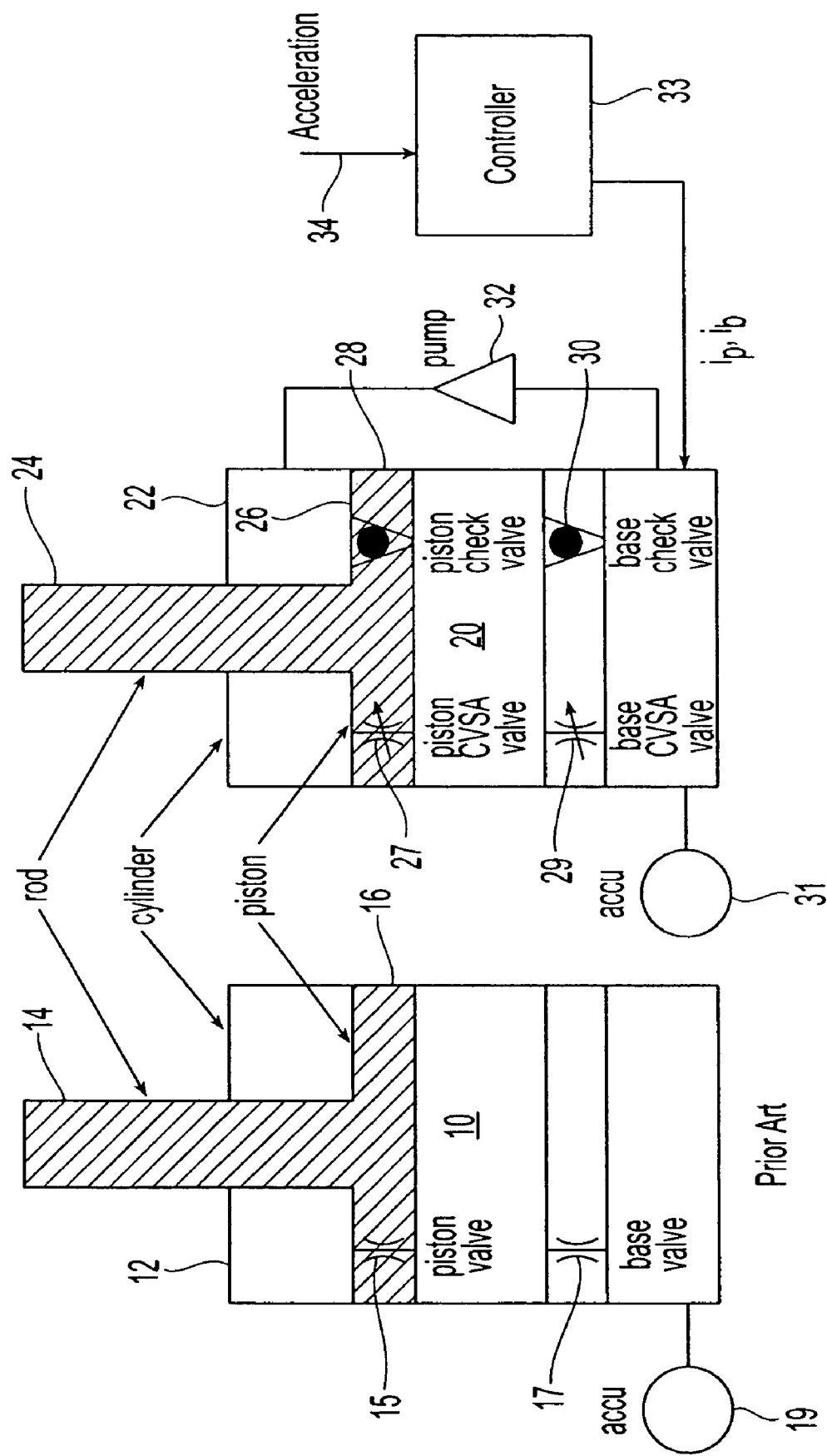
FIG. 1 is a block diagram illustrating a prior art passive shock absorber and an active shock absorber in accordance with one embodiment of the present invention.

FIG. 1 is a block diagram illustrating a prior art passive shock absorber 10 and an active shock absorber 20 in accordance with one embodiment of the present invention. Shock absorber 10 includes a cylinder 12 filled with oil and a rod 14 connected to a piston 16, which includes a piston valve 15 that provides a calibrated restriction. The change in volume caused by rod 14 moving in or out of cylinder 12 is compensated for by oil flowing in or out of an accumulator 19 through a base valve 17. The pressure drop over both base valve 17 and piston valve 15 results in a damping force acting on piston 16.

Active shock absorber 20 also includes a rod 24, a cylinder 22, a piston 26, and an accumulator 31. However, in active shock absorber 20 the piston and base valves are each replaced by a check valve (piston check valve 26 and base check valve 30) and a current controlled valve (piston CVSA valve 27 and base CVSA valve 29). In one embodiment, piston CVSA valve 27 and base CVSA valve 29 are current controlled continually variable semi-active ("CVSA") valves. Piston CVSA valve 27 has an input current "$i_p$" and base CVSA valve 29 has an input current "$i_b$". In one embodiment, the current to valves 27 and 29 is limited between $i^-=0.3$ A and $i^+=1.6$ A, which corresponds to the least and most restrictive positions of the valve (i.e., open and closed), respectively. In one embodiment, piston CVSA valve 27 controls the pressure difference across piston 26, and base CVSA valve 29 controls the pressure difference over the base (i.e., between the chamber under piston 26 and accumulator 31). In one embodiment piston CVSA valve 27 is not part of piston 26.

In operation, when rod 24 moves up (positive velocity), piston check valve 28 closes and oil flows through piston CVSA valve 27. Because the volume of rod 24 inside cylinder 22 reduces, oil is forced from accumulator 31 into cylinder 22 through base check valve 30, rendering the restriction of base CVSA valve 29 unimportant.

Figure 2:
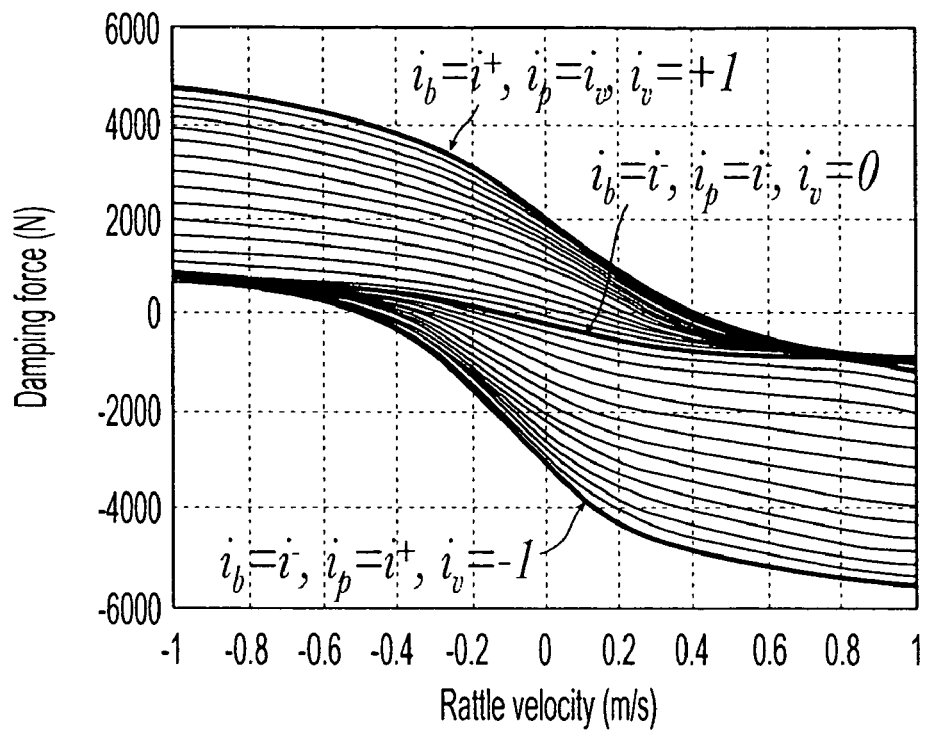
FIG. 2 graphically illustrates a working range of an active shock absorber in accordance to one embodiment of the present invention.

For positive velocities, the damping force is thus mainly controlled by the current to piston CVSA valve 27, $i_p$, as can be seen in FIG. 2. FIG. 2 is a graph 40 of damping force v. rattle velocity. The rattle velocity is the relative velocity of the rod with respect to the cylinder where positive values correspond to the rod moving out of the cylinder.

When rod 24 moves down (negative velocity), piston check valve 28 opens which renders the restriction of piston CVSA valve 27 unimportant. Because the volume of rod 24 inside cylinder 22 increases, base check-valve 30 closes and oil flows from cylinder 22 into accumulator 31 through base CVSA valve 29. For negative velocities, the damping force is thus mainly controlled by the current to base CVSA valve 29, $i_b$, as shown in FIG. 2.

Shock absorber 20 is made active by further including an external hydraulic pump 32 coupled to cylinder 22. Pump 32 creates a larger range of pressure drops over the CVSA valves and therefore an extended damping force range.

Shock absorber 20 is coupled to a controller 33 which generates a virtual current (discussed below) based on an input 34 of the upward or downward acceleration of the vehicle. The virtual current can be easily converted to $i_p$ and $i_b$ for input into piston CVSA valve 27 and base CVSA valve 29, respectively.

As discussed, FIG. 2 graphically illustrates a working range of active shock absorber 20 in accordance to one embodiment of the present invention. The damping force is plotted as a function of the rattle velocity for several combinations of currents to the base and piston valve ($i_p$ and $i_b$, respectively). The area of feasible forces is divided into two halves by the force-velocity curve obtained when $i_b=i_p=i^-$. The upper half of the working range is obtained by increasing the current to the base from $i^-$ to $i^+$ while keeping the current to the piston valve at $i^-$. The lower half of the working range is obtained by increasing the current to the piston valve from $i^-$ to $i^+$ while keeping the current to the base valve at $i^-$.

The fact that the entire envelope is covered by varying only one current signal at the time is exploited by embodiments of the present invention by introducing an artificial signal $i_v$ (referred to as a "virtual current"), which varies from $-1$ to $+1$ and corresponds to the following specific combination of base and piston valve currents:

$$i_b = \begin{cases} i^- - i_v(i^+ - i^-) & i_v < 0 \\ i^- & i_v > 0 \end{cases}$$

$$i_p = \begin{cases} i^- & i_v < 0 \\ i^- + i_v(i^+ - i^-) & i_v > 0 \end{cases}$$

This single virtual current replaces the two original currents to the base valve and the piston valve as the input signal generated by controller 33. This substitution reduces controller 33 from a multiple-output to a single-output system, which results in a simpler and more straightforward design.

Figure 3:
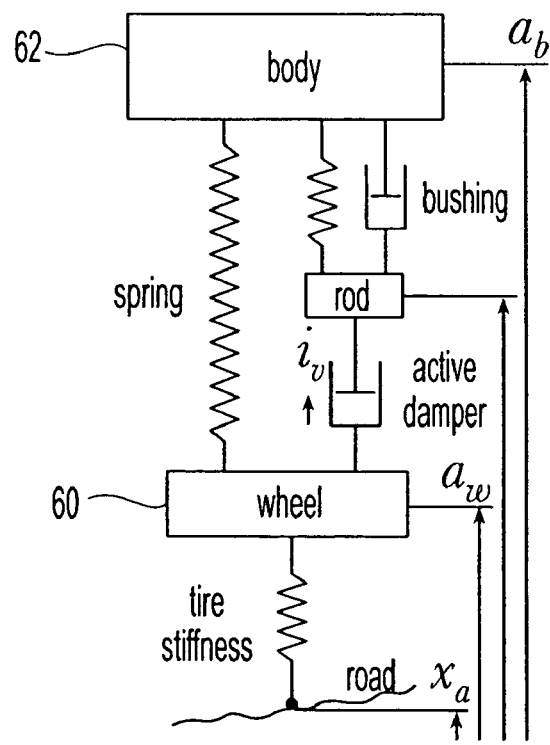
FIG. 3 illustrates a schematic representation of a shock absorber in accordance with one embodiment of the present invention in which the shock absorber is coupled to a vehicle body and a vehicle wheel.

FIG. 3 illustrates a schematic representation of the shock absorber in accordance with one embodiment of the present invention in which the shock absorber is coupled to a vehicle body 62 and a vehicle wheel 60. From a control design point of view, this is a multi-input multi-output ("MIMO") system. The acceleration of the body and the wheel, $a_b$ and $a_w$, are the outputs of the system available to controller 33. The virtual current $i_v$ to the active shock absorber is the input of the system calculated by controller 33. The imposed road displacement $x_a$ acts on the system as an external disturbance.

Figure 4:
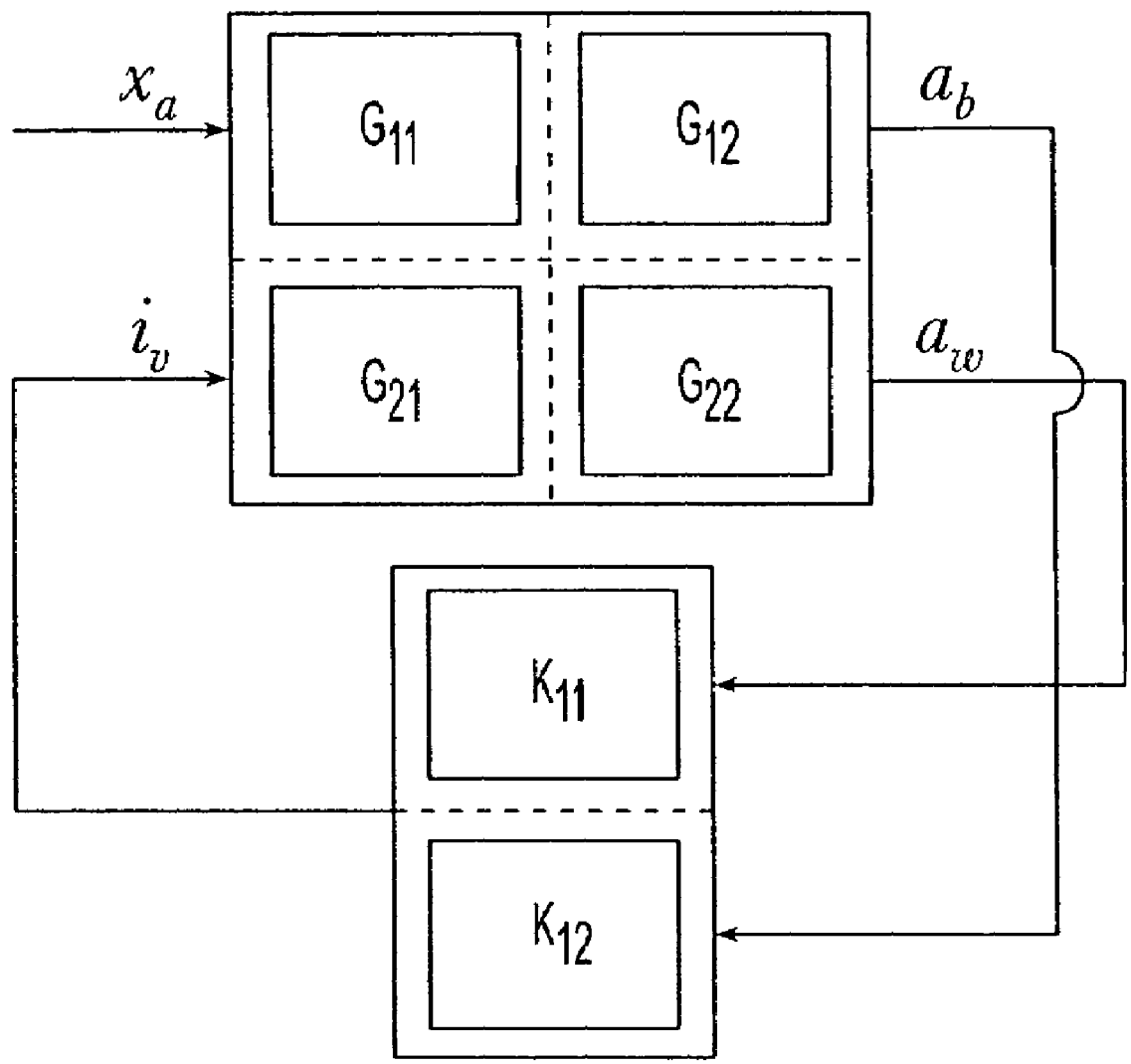
FIG. 4 is a block diagram that provides a schematic representation of the input-output relations of one embodiment of the present invention.

FIG. 4 is a block diagram that provides a schematic representation of the input-output relations of one embodiment of the present invention. The system dynamics are represented by the 2×2 transfer matrix $G_{2\times2}$, and controller 33 by the 1×2 transfer matrix $K_{1\times2}$.

In one embodiment, system dynamics and uncertainties of the present invention can be identified using a frequency domain approach consisting of four steps: (1) design of appropriate excitation signals, (2) estimation of the frequency response functions ("FRFs") of the system, (3) identification of a parametric nominal model for these FRFs, and (4) estimation of the model uncertainty.

In order to identify the dynamics of this system, in one embodiment excitation signals are designed for the inputs $i_v$ and $x_a$. A common rule in identification is to use excitation signals that correspond to the realistic excitation of the system, such that the identified linear model is a good approximation of the system for that type of excitation.

The control signal $i_v$ to the active shock absorber is excited with Gaussian band-limited white noise. The bandwidth is set to 50 Hz, which is sufficiently higher then the desired closed loop bandwidth. The amplitude level is chosen such that the 2σ-bound of the excitation signal corresponds to the saturation levels ±1 to get a good signal-to-noise ratio.

The road displacement signal $x_a$ is excited with integrated Gaussian white-noise, which spectrum corresponds to that of a stochastic road. The measured outputs are the acceleration of the body $a_b$ and wheel $a_w$.

Figure 5:
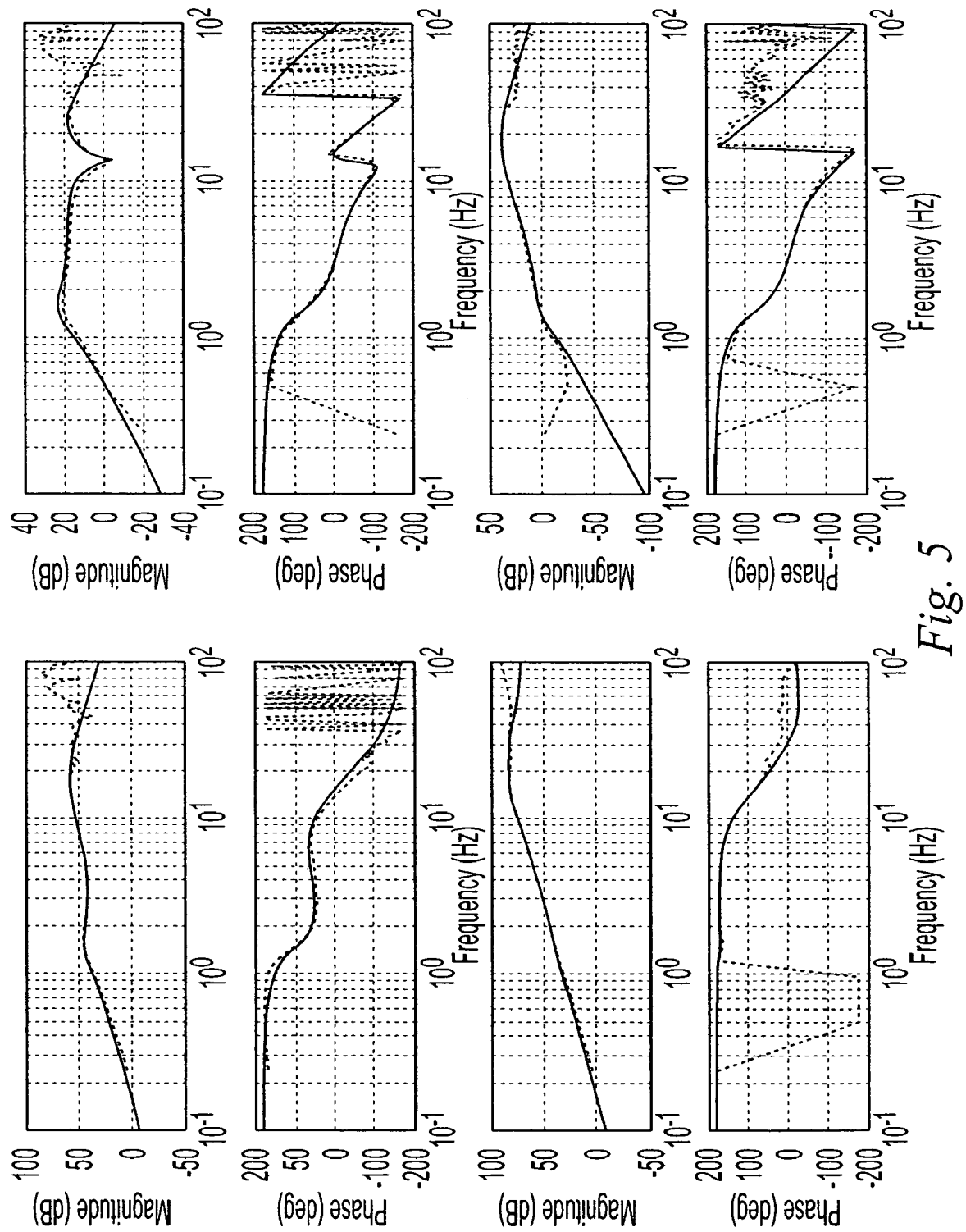
FIG. 5 graphically illustrates frequency response functions ("FRFs") measured and calculated from a reduced order multi-input multi-output ("MIMO") model.

The excitation signals are applied simultaneously to the system for 300 seconds sampled at 1 kHz. The first resonance of the system is the well damped body mode and is expected at 1.5 Hz. The lowest frequency of interest is chosen approximately a factor 5 smaller, leading to a frequency resolution of 0.24 Hz. The measurement data is divided into 145 blocks of 4096 samples, with 50% overlap. An $H_1$-estimator is used to estimate the MIMO FRF matrix. FIG. 5 graphically illustrates FRFs measured (dotted) and calculated from the reduced order MIMO model (solid): from road displacement $x_a$ (left) and virtual current $i_v$ (right) to body (top) and wheel (bottom) acceleration $a_b$ and $a_w$.

In one embodiment, a parametric transfer function ("TF") matrix is fitted on the measured multiple-input multiple-output frequency response function (MIMO FRF) matrix, using the nonlinear least squares frequency domain identification method. The aim is to fit a simple yet accurate linear MIMO model on the measured MIMO FRF matrix. The convergence of this optimization is improved if a good estimate of the number of model parameters (number of system poles and transfer function zeros) is available, and if a priori system knowledge based on physical insight can be included.

This information is obtained by representing the system as a lumped parameter model consisting of 3 masses connected by springs and dampers, as shown in FIG. 3. The dynamics of the active shock absorber are for this purpose neglected by assuming that the shock absorber force is proportional to the control current. These assumptions suggests that a linear model of order 6 exists which describes the 3 system modes: the body mode, the wheelhop mode and a bushing mode. Analysis of this lumped parameter model also shows that a double differentiator (double zero at 0 Hz) is included in all 4 transfer functions.

In one embodiment, a single-input single-output ("SISO") TF model of 6th order is fitted on each FRF separately. The 3 complex pole pairs, representing the 3 system modes, should, in theory, coincide for all 4 SISO models. However, due to noise and non-linearities the poles of the individual models may differ slightly. In one embodiment, some kind of model reduction is applied while combining these models to avoid ill-conditioned optimization in the control design and to reduce the complexity of the controller. In order to accomplish this model reduction, the poles of the 4 SISO TFs are changed to the average values of the poles of the identified SISO models. The zeros are re-identified in the frequency domain in order to fit these new commonpole models on the measured FRFs.

This re-identification is a linear least squares problem, which encounters no convergence problems. The obtained reduced order MIMO model is only slightly less accurate (in a least squares sense) than the MIMO model obtained by combining the 4 SISO model without reducing the number of common poles.

One embodiment of the system also contains a delay of 6 ms, originating from the hydraulic tubing and the electrodynamic valves, etc. It may be estimated based on the linear phase lag present in all FRFs. A 2nd-order Pade approximation may be used to convert this delay to a pair of complex poles and right-half-plane zeros. These poles and zeros are added to the reduced order model, yielding the parametric nominal model G as shown in FIG. 4.

Figure 6:
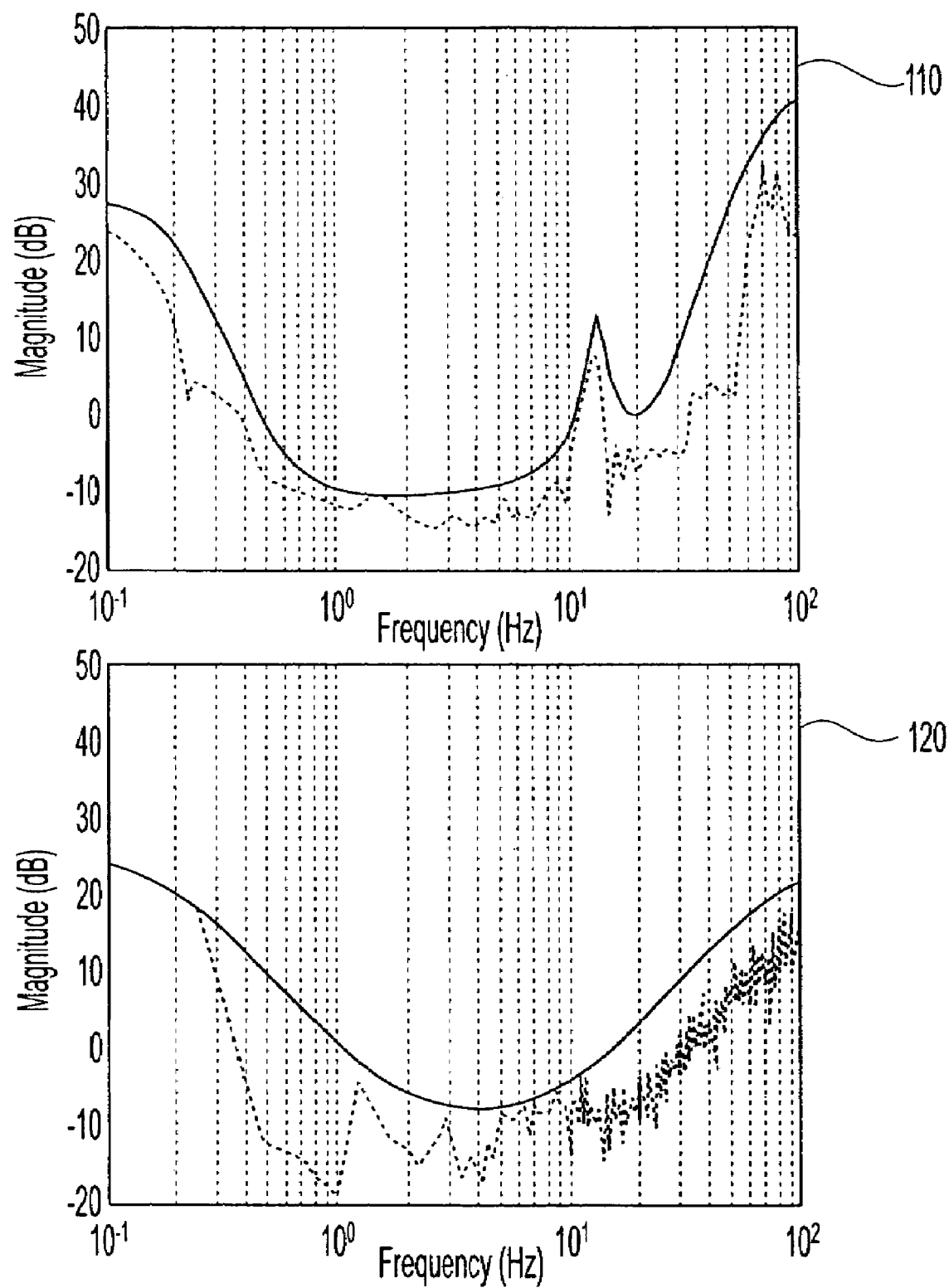
FIG. 6 graphically illustrates FRFs of the estimated multiplicative uncertainty and the fitted linear models.

The nominal model G is a linear approximation of a modelling of the dynamics of a model of a vehicle that includes an embodiment of the present invention. Model uncertainties are caused by sensor noise, nonlinearities and unmodelled high-frequency dynamics. The uncertainties may be estimated by comparing measured FRFs with the FRF matrix of G by dividing the 145 data blocks into 10 sets of 14 blocks. The relative difference between these FRFs are averaged, yielding the multiplicative uncertainties $W_T^{ab}$ and $W_T^{aw}$. Linear models then may be fitted on the uncertainty estimates. FIG. 6 graphically illustrates the FRFs of the estimated multiplicative uncertainty (dotted) and the fitted linear models (solid).

A 12th-order model is fitted on the multiplicative uncertainty for the body acceleration output, as shown in graph 110 of FIG. 6. The uncertainty is well below 100% (0dB) between 0.5 and 10 Hz. The lightly damped zero at 12 Hz in the model G causes the relative uncertainty to peak at this frequency.

A 4th order model is fitted on the multiplicative uncertainty for the wheel acceleration output, as shown in graph 120 of FIG. 6. The uncertainty is below 100% (0 dB) between 1 and 15 Hz.

Figure 7:
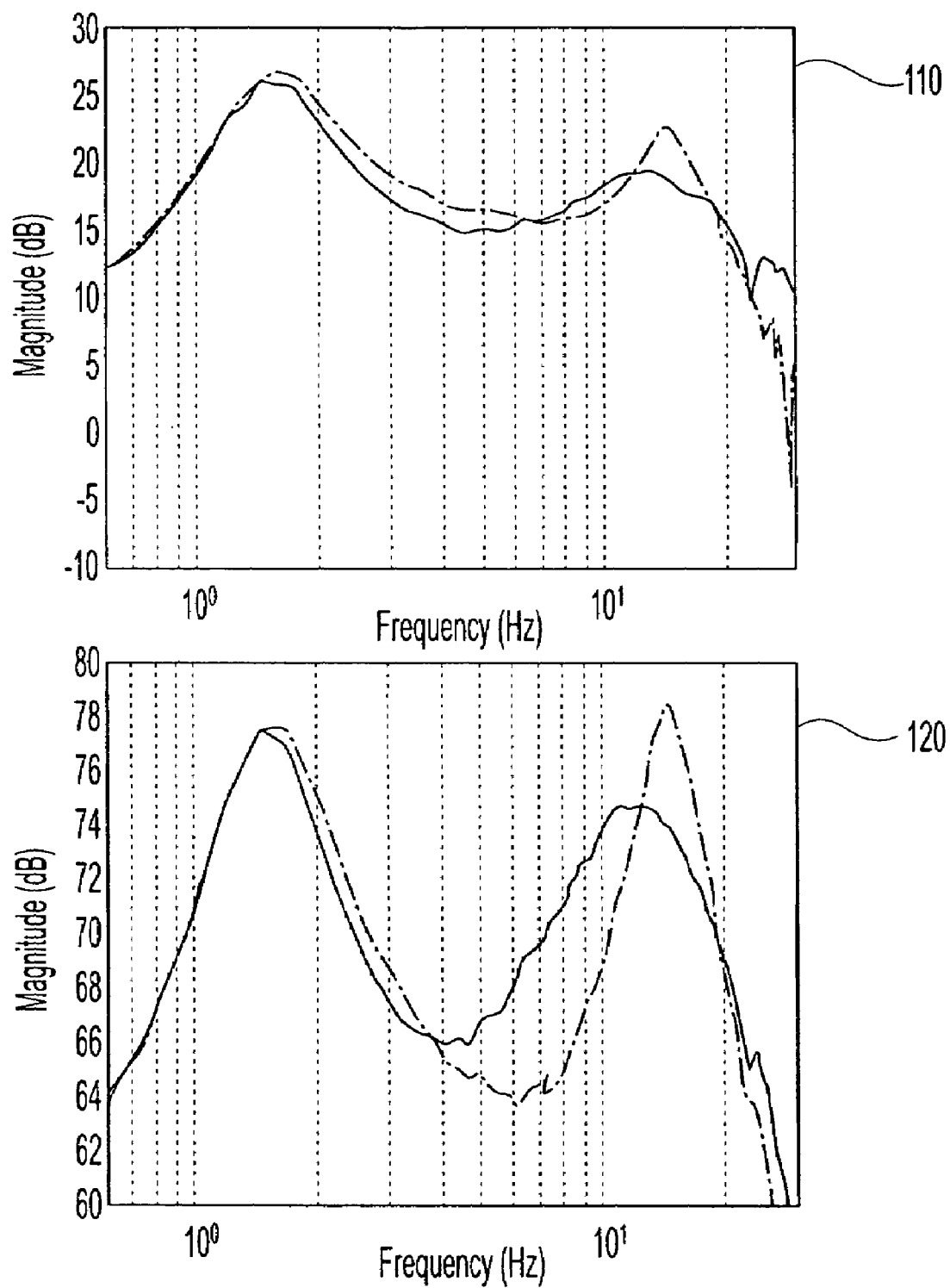
FIG. 7 graphically illustrates FRFs from road to body acceleration and tire force for an uncontrolled active suspension and an tuned passive suspension.

One embodiment of controller 33 is a linear controller that attenuates the body acceleration in the frequency region around the body mode (1.5 Hz), without amplifying the body acceleration or tire force variations in other frequency regions. This allows for an improvement of both the comfort and handling characteristics. Robust performance is accounted for by taking into account estimated model uncertainties. A standard passive shock absorber tuned for this suspension system may be used as a reference, as shown in FIG. 7 which graphically illustrates FRFs from road to body acceleration (graph 130) and tire force (graph 140) for the uncontrolled active suspension (solid) and the tuned passive suspension (dash-dot).

The generalized plant P used in classic robust control design consists of 2 types of inputs and outputs: exogenous inputs and outputs, and controller inputs and outputs. The frequency content of the exogenous input signals and the desired frequency content of the exogenous output signals is expressed by frequency domain weighting functions, such that the desired performance can be expressed as a bound on the H-infinity norm of the augmented plant.

One embodiment of the present invention has one exogenous input, the simulated road displacement $x_a$, which acts as an unmeasured disturbance. The frequency content of a typical stochastic road is integrated white noise, which is modelled by the weighting function $W_r$. It has a lag-compensator characteristic with a 20 dB/decade slope in the frequency region of interest, and a zero slope at low and high frequencies to satisfy the necessary conditions for a sound state-space H-infinity control design problem formulation.

A first exogenous output signal $z_u$ is defined as the weighted control input $i_v$, using a weighting function $W_u$. $W_u$ is set equal to 1, expressing that the 2-norm of the control input should be smaller then 1 for all frequencies to avoid excessive saturation of the control current $i_v$.

A second exogenous output signal $z_p$ is defined as the weighted body acceleration signal $a_b$, using a weighting function $W_p$. $W_p$ is a band-pass filter with cut-off frequencies around the body mode resonance, such that the amplitude of the system from $w_r$ to $z_p$ is larger than one in the frequency region of this resonance. This expresses that the controller should attenuate the body acceleration at the body mode resonance. The exact locations of the cut-off frequencies of this band-pass filter weight are the tuning parameters in one embodiment of the present invention. The desired width of the frequency region of attenuation is increased until the control design problem becomes infeasible.

The system is also augmented with the multiplicative output uncertainty models $W_T^{ab}$ and $W_T^{aw}$. This creates the uncertainty inputs $u_\Delta^{ab}$ and $u_\Delta^{aw}$, and outputs $v_\Delta^{ab}$ and $u_\Delta^{aw}$.

Figure 8:
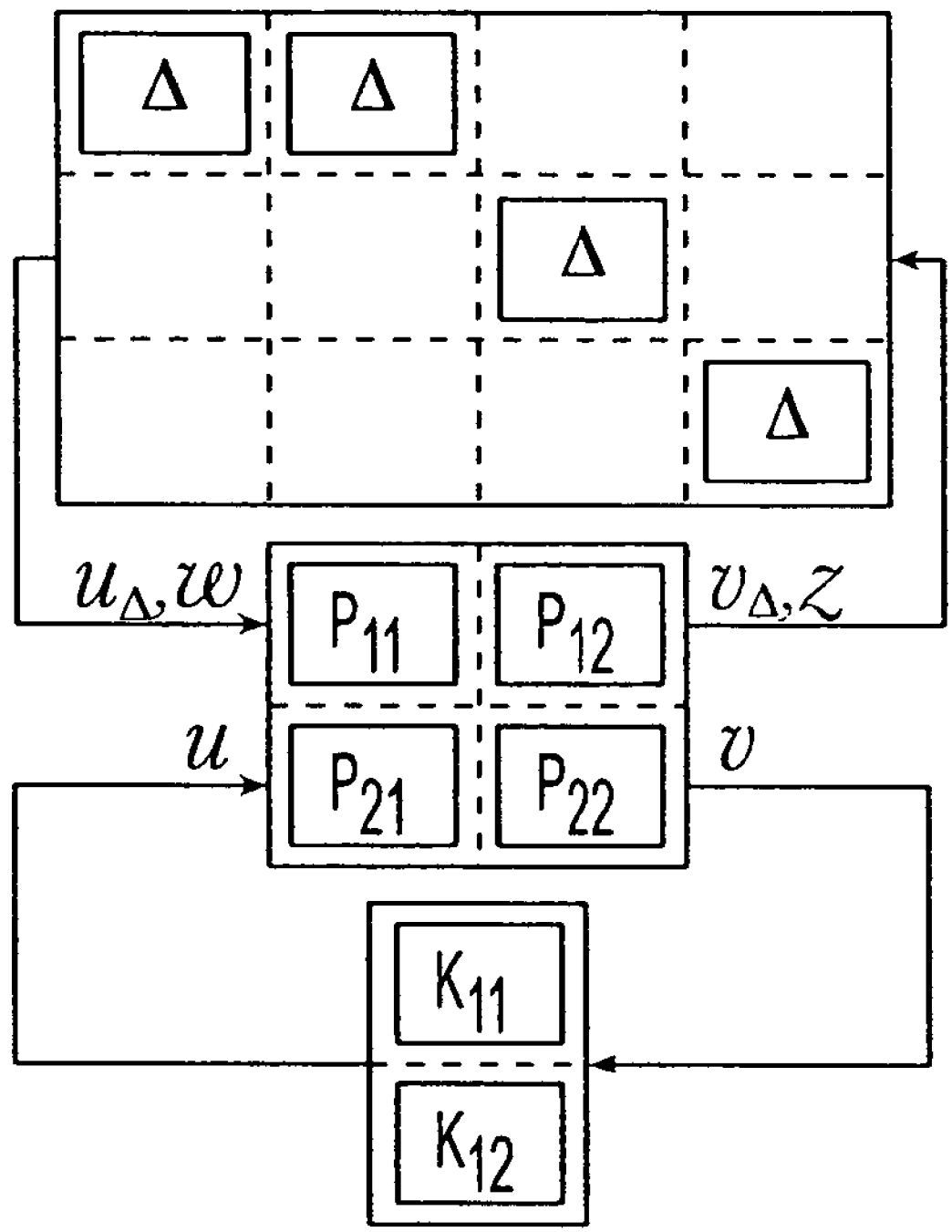
FIG. 8 is a block diagram of a closed loop system.

The generalized plant P is obtained by absorbing the weights $W_r$, $W_u$, $W_P$, $W_T^{ab}$ and $W_T^{aw}$ in the model G yielding a block diagram representation as illustrated in FIG. 8.

A controller K achieves robust performance if it stabilizes the closed loop system shown in FIG. 8. The μ-synthesis control design framework is capable of taking into account the structure of the Δ-blocks since it is based on the structured singular value of the closed loop system. The controller synthesis in one embodiment is based on the DK-iteration scheme in which alternating D-scaling functions are fit to approximate the structured singular value (D-step) and an H-infinity controller is designed (K-step).

Figure 9:
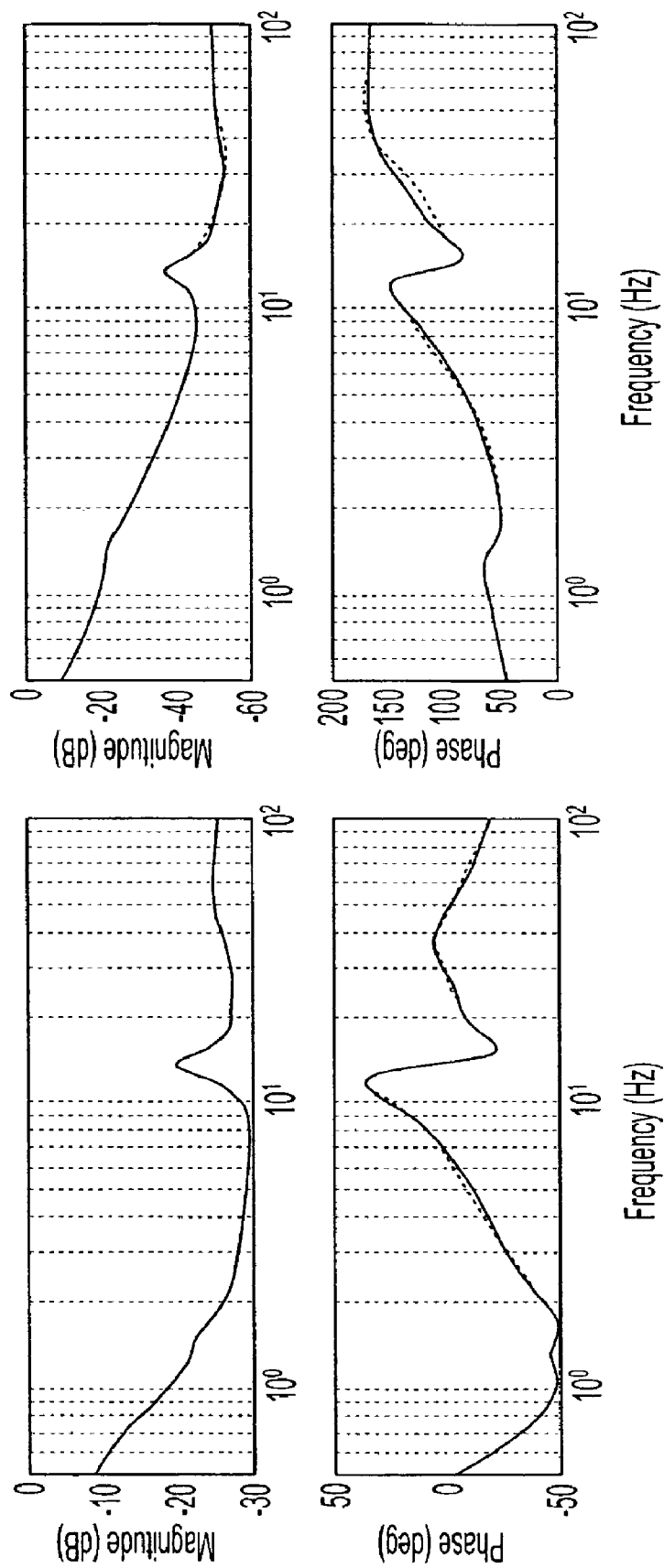
FIG. 9 graphically illustrates one embodiment of a an FRF of a linear controller obtained with μ-synthesis and a reduced order controller.

FIG. 9 graphically illustrates one embodiment of controller 33 obtained with μ-synthesis (solid) and a reduced order controller (dotted). The inputs of the controller are the measured body and wheel acceleration $a_b$ (left) and $a_w$ (right), the output is the virtual current to the active shock absorber $i_v$. The order of the controller is 60, which is the order of the augmented plant plus the order of the Dscalings.

Figure 10:
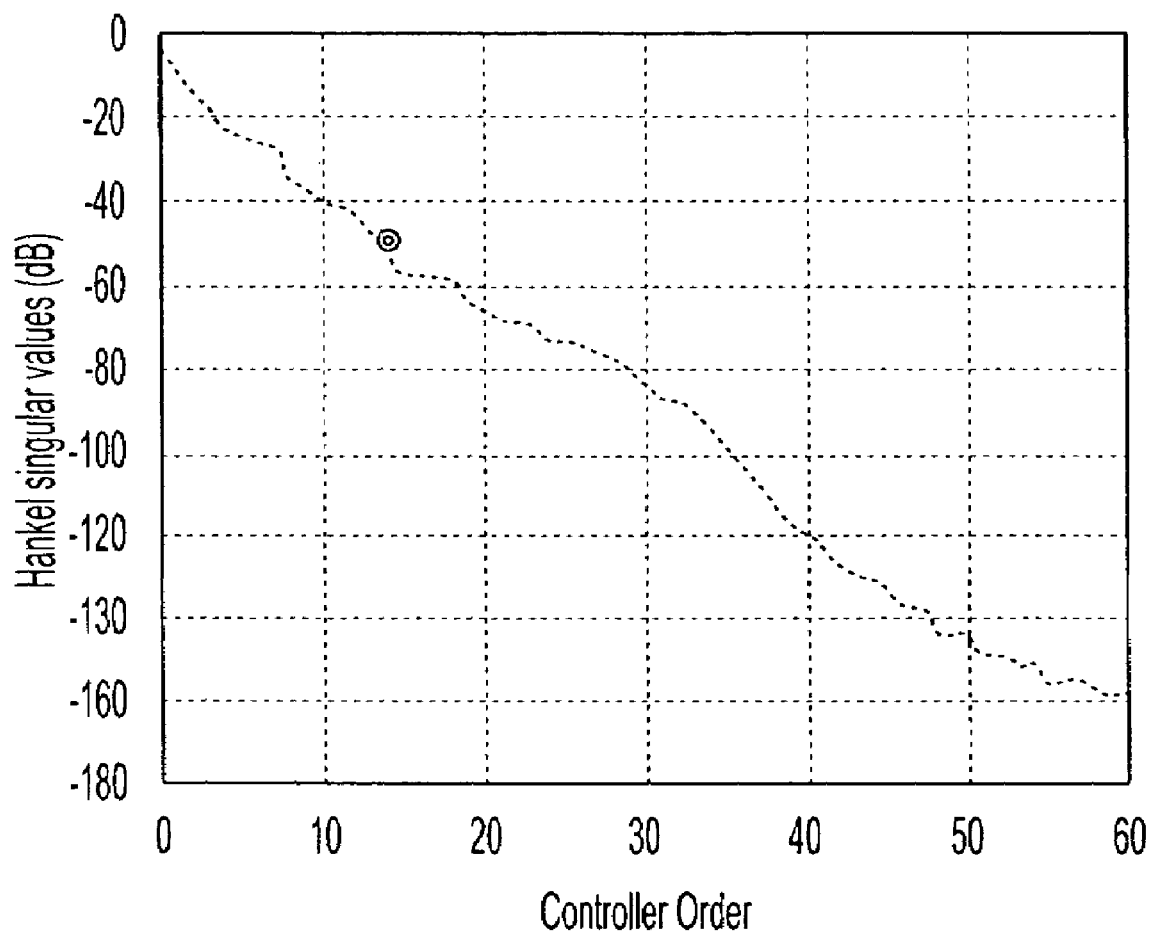
FIG. 10 shows a Hankel singular value spectrum of a controller and indicates a selected order.

In one embodiment, the high order of the controller has a number of disadvantages briefly mentioned below:
  Numerically ill-conditioned statespace matrices
  Real time processor overload
  Excessive memory usage Therefore, in one embodiment the order of the controller is reduced by an optimal Hankel approximation. FIG. 10 shows the Hankel singular value spectrum of the controller and indicates the selected order: 14. Comparison of the FRFs of the reduced order and the original controller in FIG. 9 shows that there are only small deviations at higher frequencies above 20 Hz such that deterioration of the closed loop performance is not expected.

As disclosed, embodiments of the active suspension of the present invention with linear robust control design techniques results in a controller that is able to significantly increase comfort compared to the comfort obtained with a tuned passive shock-absorber: the attenuation of the body acceleration around the body mode frequency is increased with 50%. A transformation of the physical base and piston valve currents into a single virtual current allows the application of SISO linear control techniques instead of MIMO nonlinear control design. The obtained handling performance is comparable to that of the tuned passive shock absorber. There is no significant increase of peak values of the tire force.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A vehicle suspension system comprising:
   a cylinder;
   a rod inserted within said cylinder;
   a piston coupled to said rod;
   a piston valve coupled to said piston, wherein said piston valve has an input piston current ($i_p$);
   a base coupled to said cylinder;
   a base valve coupled to said base, wherein said base valve has an input base current ($i_b$); and
   a controller coupled to said piston valve and said base valve, said controller adapted to generate said input piston current and said input base current based on a generated virtual current ($i_v$);
   wherein said input piston current and said input base current are generated from said virtual current based substantially on the following equation:

$$i_b = \begin{cases} i^- - i_v(i^+ - i^-) & i_v < 0 \\ i^- & i_v > 0 \end{cases}$$

$$i_p = \begin{cases} i^- & i_v < 0 \\ i^- + i_v(i^+ - i^-) & i_v > 0 \end{cases}.$$

2. The vehicle suspension system of claim 1, wherein said piston valve and said base valve are current controlled continually variable semi-active valves.

3. The vehicle suspension system of claim 1, further comprising a pump coupled to said cylinder.

4. The vehicle suspension system of claim 1, further comprising a piston check valve coupled to said piston and a base check valve coupled to said base.

5. The vehicle suspension system of claim 1, wherein said virtual current is generated based on a vertical acceleration of a vehicle and a wheel.

6. The vehicle suspension system of claim 1, wherein said virtual current is generated based on a linear model.

7. A method of controlling an active shock absorber of a vehicle, said shock absorber having a current controlled piston valve and a current controlled base valve, said method comprising:
   receiving a vertical acceleration of the vehicle;
   calculating a virtual current based on the acceleration; and
   calculating a piston valve current ($i_p$) and a base valve current ($i_b$) based on the virtual current ($i_v$);
   wherein said piston valve current and said base valve current are calculated using substantially the following equation:

$$i_b = \begin{cases} i^- - i_v(i^+ - i^-) & i_v < 0 \\ i^- & i_v > 0 \end{cases}$$

$$i_p = \begin{cases} i^- & i_v < 0 \\ i^- + i_v(i^+ - i^-) & i_v > 0 \end{cases}.$$

8. The method of claim 7, wherein said virtual current is calculated based on a linear model.

9. The method of claim 7, wherein said virtual current is calculated by a μ-synthesis designed controller.

10. The method of claim 7, said controller is further adapted to calculate the virtual current based on a vertical wheel acceleration.

11. A controller for controlling an active shock absorber of a vehicle, said shock absorber having a current controlled piston valve and a current controlled base valve, said controller adapted to:
   receive a vertical acceleration of the vehicle;
   calculate a virtual current based on the acceleration; and
   calculate a piston valve current ($i_p$) and a base valve current ($i_b$) based on the virtual current ($i_v$);
   wherein said piston valve current and said base valve current are calculated using substantially the following equation:

$$i_b = \begin{cases} i^- - i_v(i^+ - i^-) & i_v < 0 \\ i^- & i_v > 0 \end{cases}$$

$$i_p = \begin{cases} i^- & i_v < 0 \\ i^- + i_v(i^+ - i^-) & i_v > 0 \end{cases}.$$

12. The controller of claim 11, wherein said virtual current is calculated based on a linear model.

13. The controller of claim 11, comprising a μ-synthesis design.

14. The controller of claim 11, said controller is further adapted to calculate the virtual current based on a vertical wheel acceleration.

* * * * *